(12) United States Patent  
Greiner

(10) Patent No.: US 11,760,073 B2
(45) Date of Patent: Sep. 19, 2023

(54) VEHICLE SHEET COATING

(71) Applicant: Craig Greiner, Foothill Ranch, CA (US)

(72) Inventor: Craig Greiner, Foothill Ranch, CA (US)

(*) Notice: Subject to any disclaimer, the term of this patent is extended or adjusted under 35 U.S.C. 154(b) by 115 days.

(21) Appl. No.: 16/903,223

(22) Filed: Jun. 16, 2020

(65) Prior Publication Data
US 2020/0398546 A1 Dec. 24, 2020

Related U.S. Application Data

(60) Provisional application No. 62/864,385, filed on Jun. 20, 2019.

(51) Int. Cl.
B32B 33/00 (2006.01)
B05D 5/10 (2006.01)
B05D 5/06 (2006.01)
B29C 65/48 (2006.01)
B05D 3/10 (2006.01)
B05D 5/04 (2006.01)
B05D 7/00 (2006.01)
B32B 27/08 (2006.01)

(52) U.S. Cl.
CPC .............. *B32B 33/00* (2013.01); *B05D 3/104* (2013.01); *B05D 5/04* (2013.01); *B05D 5/06* (2013.01); *B05D 5/10* (2013.01); *B05D 7/57* (2013.01); *B29C 65/48* (2013.01); *B32B 27/08* (2013.01); *B32B 2255/10* (2013.01); *B32B 2255/24* (2013.01); *B32B 2307/4026* (2013.01); *B32B 2405/00* (2013.01); *B32B 2605/00* (2013.01)

(58) Field of Classification Search
CPC .............. B05D 7/57; B05D 5/04; B05D 3/104
See application file for complete search history.

(56) References Cited

U.S. PATENT DOCUMENTS

| | | | | |
|---|---|---|---|---|
| 2010/0136321 A1* | 6/2010 | Uesugi | ..................... | C09J 7/385 428/323 |
| 2013/0033540 A1* | 2/2013 | Lux | ........................ | B65C 9/2213 347/20 |
| 2013/0236719 A1* | 9/2013 | Ohwada | .................. | C08L 75/06 156/60 |

* cited by examiner

Primary Examiner — Dah-Wei D. Yuan
Assistant Examiner — Kristen A Dagenais
(74) Attorney, Agent, or Firm — Paul J. Backofen, Esq.

(57) ABSTRACT

A multilayer vehicle exterior coating is both durable and easy to install and conforms FAA standards. This vehicle sheet coating has no film or substrate resulting in a finished coating sheet that is about 6 mils thick (0.006"). The multilayer protective sheet material is suitable for application to vehicle exterior surface.

3 Claims, 1 Drawing Sheet

VEHICLE SHEET COATING

FIELD OF THE INVENTIONS

The inventions described below relate to the field of sheet coatings for vehicles.

BACKGROUND OF THE INVENTIONS

Conventionally, vehicle exteriors are protected/decorated with one or more layers of paint or colored film sheets. Both of the conventional exterior treatments deteriorate quickly on the exterior skin of a jet airplane and must be reapplied at regular intervals. This takes the airplane out of service until the exterior treatment is finished. Paint is particularly problematic for carriers with colorful livery. Each color requires a separate day to mask, paint and cure the applied paint. Each layer of paint increases the thickness of the coating and increases the weight of the airplane. Conventional exterior coatings may also be thick, often between 10 and 15 mils thick (0.010"-0.015"). The coating edges create drag-inducing turbulence on the skin of the airplane which promotes deterioration of the coating.

SUMMARY

The devices and methods described below provide for a thin multilayer vehicle sheet coating with no substrate that is durable and easy to install and conforms FAA standards. This vehicle sheet coating has no film or substrate resulting in a finished coating sheet that is about 6 mils thick (0.006"). The vehicle sheet coating is a multilayer protective sheet material is suitable for application to vehicle exterior surface.

DETAILED DESCRIPTION OF THE INVENTIONS

Figure 1:
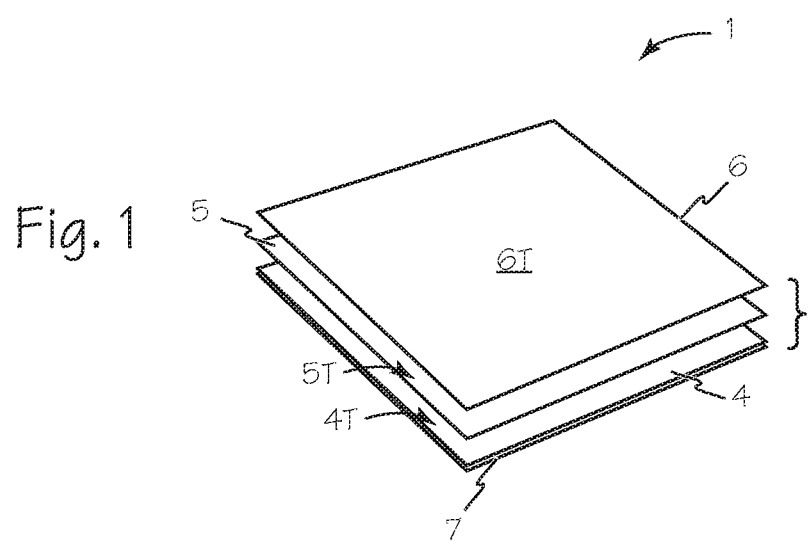
FIG. 1 is an exploded perspective view of the layers of a vehicle sheet coating.
Figure 2:
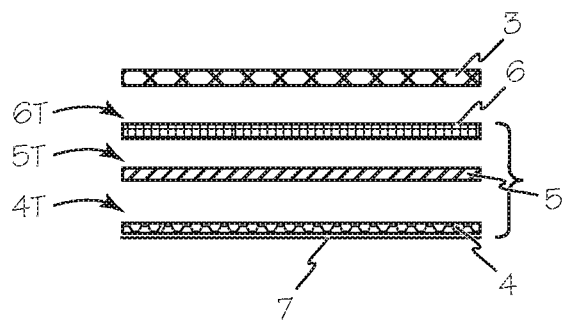
FIG. 2 is an exploded side view of the vehicle sheet coating of FIG. 1.

FIG. 1 is an exploded perspective view of the layers of vehicle sheet coating 1. FIG. 2 is an exploded side view of the vehicle sheet coating 1 with a conventional clearcoat layer 3. Vehicle sheet coating 1 is formed of three layers, adhesive layer 4, color layer 5 and modified clear coat layer 6. Adhesive layer 4 is generally about 2 mils thick (0.002") and may be any suitable adhesive with a top surface 4T that has been treated with a treatment solution to make the adhesive layer receptive to the application of color. The treatment solution may be methyl ethyl ketone (MEK) and/or alcohol. Color layer 5 is composed of any suitable color elements including toner, ink or solvent ink. Modified clearcoat layer 6 is formed, contrary to the clearcoat manufacturers instructions for use, by adding translucent pigment to the clearcoat. The added pigments enable the modified clearcoat layer to better adhere to the color layer and to dry with a dull/cloudy finish on top surface 6T. The dull/cloudy finish enables a painter applying a conventional clearcoat layer such as layer 3 to a vehicle with a vehicle sheet coating 1 on its surface to distinguish which areas of the surface/ vehicle sheet coating have been covered with conventions clearcoat as the conventional clearcoat layer 3 will be smooth and shiny.

To produce vehicle sheet coating 1, the adhesive layer 4 is formed on any suitable removable backing such as backing 7. The top surface 4T of the adhesive layer 4 is prepared by wiping the surface with either MEK or alcohol or a mixture of MEK and alcohol. The chemicals clean and soften the adhesive surface, which makes it more ink receptive. Most of the time alcohol works fine, but on a colder day or when the humidity is low, MEK is required. We do a scratch test to see if the material is soft enough to accept the ink. Alternatively the alcohol and MEK may be applied together until the adhesive softens sufficiently to accept the application of the color layer. Color layer 5 is applied to the prepared top surface 4T. Once the color layer 5 is applied to the adhesive, the application of the modified clearcoat layer 6 to the top surface 5T must be completed within about 12 to 24 hours depending the ambient temperature and humidity. Higher temperatures shorten the time during which the modified clearcoat layer may be successfully applied. The modified clearcoat layer 6 is then deposited on to color layer 5 forming a dull/cloudy top surface 6T that will be receptive to conventional clearcoat after the vehicle sheet coating is applied to the desired vehicle.

The process of forming vehicle sheet coating 1 may also be performed in reverse of the process outlined above. The modified clearcoat layer may be applied to a suitable removable substrate and then the color layer may be applied to the modified clearcoat layer and the adhesive may be applied over the color layer.

Once formed, one or more vehicle sheet coatings may be attached to a vehicle such as an airplane by removing the backing 7 from the adhesive layer and pressing the vehicle sheet coatings in place. When the vehicle sheet coatings are applied to the vehicle, a conventional clearcoat 3 is applied over the vehicle sheet coatings.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. A method of forming a 0.006" thick sheet coating for airplanes comprising the steps:
   depositing a 0.002" thick adhesive layer on a removable backing leaving a top surface exposed;
   preparing the top surface of the adhesive layer with a treatment solution;
   testing the top surface to confirm that the adhesive layer is ready for the application of a color layer;
   applying one or more color elements to the top surface of the adhesive layer to form a color layer; and
   applying clearcoat with translucent pigment to the color layer to form a modified clearcoat layer on the color layer with the color layer between the modified clearcoat layer and the adhesive layer, the translucent pigment operable to form a dull finish on the modified clearcoat layer.

2. The airplane sheet coating of claim 1 wherein the treatment solution is selected from the group consisting of alcohol, methyl ethyl ketone or a combination of alcohol and methyl ethyl ketone.

3. The airplane sheet coating of claim 1 wherein the step of testing the top surface is followed by the step of:
   reapplying the treatment solution to the top surface;
   retesting the top surface to confirm that the adhesive layer is ready for the application of a color layer.

\* \* \* \* \*